United States Patent
Wurm et al.

(10) Patent No.: US 11,529,936 B2
(45) Date of Patent: Dec. 20, 2022

(54) METHOD FOR CHECKING THE PLAUSIBILITY OF A LATERAL ACCELERATION AND A NUMBER OF FURTHER INPUT VARIABLES OF A TRANSMISSION SHIFTING PROGRAM OF AN AUTOMATED TRANSMISSION OF A MOTOR VEHICLE

(71) Applicant: Dr. Ing. h.c. F. Porsche Aktiengesellschaft, Stuttgart (DE)

(72) Inventors: Andreas Wurm, Stuttgart (DE); Philip Jost, Stuttgart (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 253 days.

(21) Appl. No.: 16/878,632

(22) Filed: May 20, 2020

(65) Prior Publication Data
US 2020/0369250 A1 Nov. 26, 2020

(30) Foreign Application Priority Data

May 21, 2019 (DE) .................... 10 2019 113 490.0

(51) Int. Cl.
*B60T 8/172* (2006.01)
(52) U.S. Cl.
CPC ........ *B60T 8/172* (2013.01); *B60G 2400/104* (2013.01)
(58) Field of Classification Search
CPC ........................... B60T 8/172; B60G 2400/104
See application file for complete search history.

(56) References Cited

U.S. PATENT DOCUMENTS 6,519,523 B2    2/2003  Schuelke et al.
6,594,563 B1 *  7/2003  Ding .................... B60T 8/1755
                                                701/41
(Continued)

FOREIGN PATENT DOCUMENTS

DE       19958492 A1    6/2001
DE       19939872 B4    7/2012
(Continued)

*Primary Examiner* — James M McPherson
*Assistant Examiner* — Bakari Underwood
(74) *Attorney, Agent, or Firm* — Leydig, Voit & Mayer, Ltd.

(57) ABSTRACT

A method for checking the plausibility of a lateral acceleration and further input variables of a transmission shifting program includes measuring, over a defined route section, a lateral acceleration signal, calculating a mean value of the measured lateral acceleration signal, and calculating, based on the further input variables, a plurality of n≥2 different lateral acceleration sensor reference variables. The different lateral acceleration sensor reference variables are calculated by a lateral acceleration reference model for the defined route section. The method further includes determining, for each respective lateral acceleration sensor reference variable, a respective mean value of a calculated lateral acceleration, determining deviations of the mean value of the measured lateral acceleration and the mean values of the calculated lateral accelerations, and evaluating, based on a magnitude of the deviations, whether or not the measured lateral acceleration and the further input variables are plausible.

13 Claims, 1 Drawing Sheet

(56) References Cited

U.S. PATENT DOCUMENTS

| | | | | |
|---|---|---|---|---|
| 8,660,768 B2* | 2/2014 | Stoehr | ............... | B62D 15/0215 |
| | | | | 701/41 |
| 8,930,097 B2* | 1/2015 | Vandekerkhove | ...... | B60T 8/172 |
| | | | | 701/51 |
| 2003/0120403 A1* | 6/2003 | Damaske | ................ | G01P 21/00 |
| | | | | 701/30.6 |

FOREIGN PATENT DOCUMENTS

| DE | 102018125892 A1 | 4/2020 |
|---|---|---|
| JP | 2003207519 A | 7/2003 |
| JP | 2006143102 A | 6/2006 |

\* cited by examiner

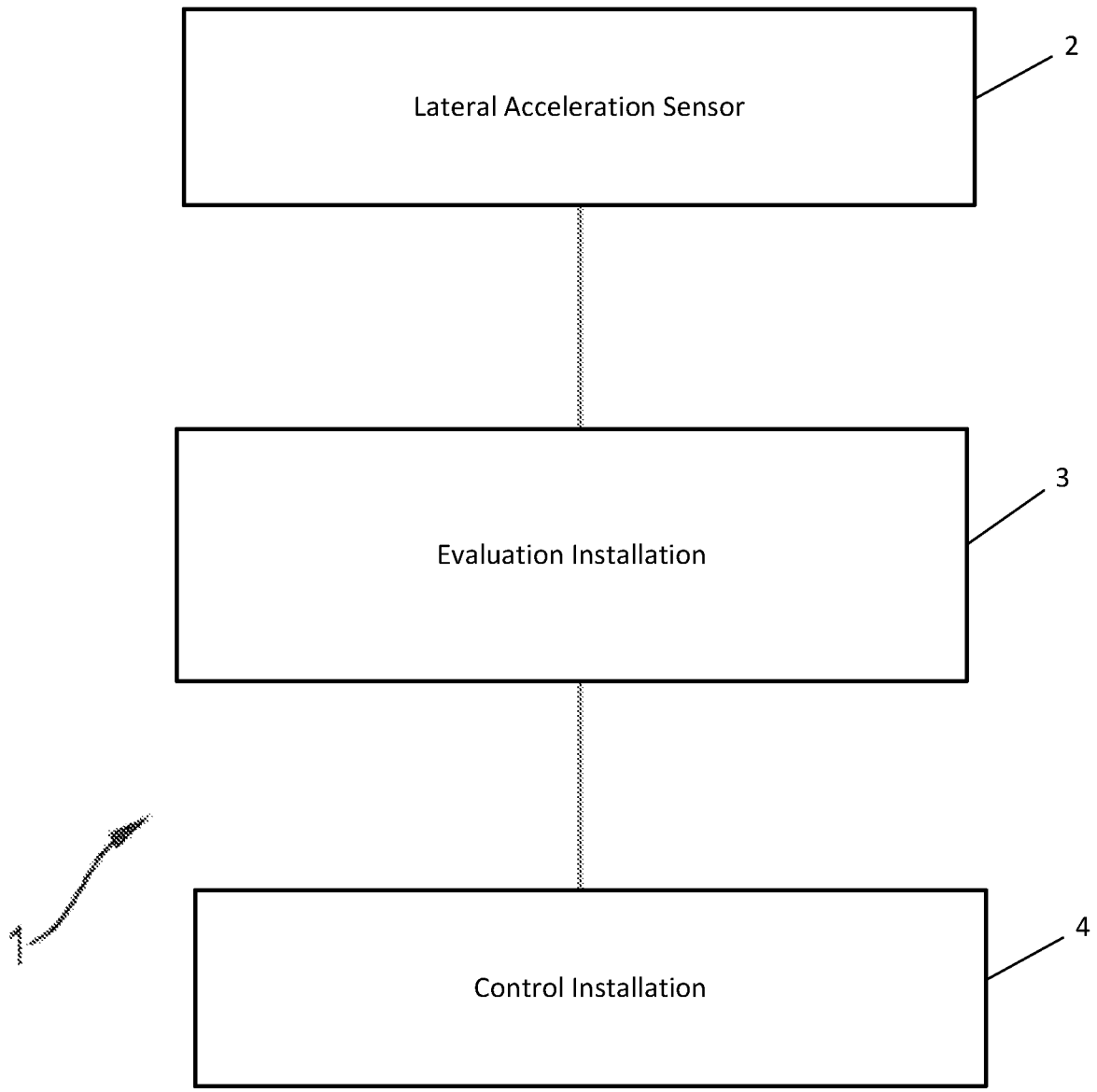

METHOD FOR CHECKING THE PLAUSIBILITY OF A LATERAL ACCELERATION AND A NUMBER OF FURTHER INPUT VARIABLES OF A TRANSMISSION SHIFTING PROGRAM OF AN AUTOMATED TRANSMISSION OF A MOTOR VEHICLE

CROSS REFERENCE TO RELATED APPLICATIONS

This application claims benefit to German Patent Application No. DE 10 2019 113 490.0, filed May 21, 2019, which is hereby incorporated by reference herein.

FIELD

The present disclosure relates to a method for checking the plausibility of a lateral acceleration and a number of further input variables of a transmission shifting program of an automated transmission of a motor vehicle.

BACKGROUND

An automated transmission of a motor vehicle, which can in particular be a double-clutch transmission or a torque-converter transmission, has a transmission shifting program by means of which the shifting procedures can be controlled in an automated manner. To this end, the transmission shifting program is fed different kinematic input variables which represent in particular a current driving state of the motor vehicle and are processed by the transmission shifting program. One of said kinematic input variables is, for example, a lateral acceleration of the motor vehicle which can be measured by means of a corresponding lateral acceleration sensor.

In the prior art, the lateral accelerations of a non-rail-bound, dual-track vehicle which are with the aid of the lateral acceleration sensor detected by way of measuring technology are often checked in terms of plausibility with the aid of so-called single-track models, for example. The validity of single-track models of this type herein applies only in a linear range but no longer in a range in which the tires and the ride dynamics are at their limits. The consequence thereof is that valid model variables for being able to check the plausibility of the lateral accelerations detected by way of measuring technology cannot be available in numerous driving situations, in particular at a limit range while the motor vehicle is oversteering or understeering.

The signal of the lateral acceleration sensor has a significant influence on the transmission shifting program of the automated transmission and, depending on the application, has the potential for influencing operating points of an internal combustion engine and thus the exhaust emissions behavior of the motor vehicle. On-board diagnostics are thus required.

DE 199 58 492 A1 describes a method for determining an unstable driving state of a motor vehicle. DE 199 39 872 B4 discloses a method for monitoring by sensor in particular for an ESP system of a motor vehicle.

A method for checking the plausibility of a lateral acceleration of a non-rail-bound dual-track motor vehicle is known from DE 10 2018 125 892.5, not previously published, in which method a lateral acceleration signal of a lateral acceleration sensor is measured over at least one defined route section on which the motor vehicle is moving, and a plurality of lateral acceleration reference variables are calculated for said route section by means of a lateral acceleration reference model, wherein furthermore a mean value of the measured lateral acceleration is determined from the lateral acceleration signal of the lateral acceleration sensor, an a mean value of the calculated lateral acceleration is determined from one of the lateral acceleration reference variables, and the deviation of the two mean values over the at least one defined route section is determined, and it is evaluated by means of the size of the deviation whether or not the lateral acceleration is plausible. In this method, a comparison between the mean value of the lateral acceleration detected by way of measuring technology by means of the lateral acceleration sensor and the mean value of a single lateral acceleration reference variable obtained by calculation thus takes place, wherein the deviation of said two mean values is used for an evaluation as to whether or not the measured lateral acceleration is plausible. This method and the refinements disclosed in DE 10 2018 125 892.5 enable the plausibility of the lateral accelerations measured by means of the lateral acceleration sensor to be checked even in such driving situations, in particular in situations in a range at the limit, in which no checking of the plausibility is possible with the aid of single-track methods.

The mean value of the calculated lateral accelerations can in particular be calculated from the individual road wheel speeds (road wheel rotating speeds), wherein the detection of the individual road wheel speeds takes place in particular in a ride dynamics control installation of the motor vehicle. However, it has been demonstrated that said detection of the individual road wheel speeds in the ride dynamics control installation is not verified to a sufficiently accurate extent. In the case of an error, a potential error message in a corresponding error memory could be, for example: "The calculated mean value of the lateral acceleration and the measured mean value of the lateral acceleration do not match". However, it would have to be investigated by way of a diagnostic process in a workshop which of said two mean values is erroneous in this instance.

SUMMARY

In an embodiment, the present invention provides a method for checking the plausibility of a lateral acceleration and a number of further input variables of a transmission shifting program of an automated transmission of a motor vehicle. The method includes measuring, over a defined route section on which the motor vehicle is moving, a lateral acceleration signal of a lateral acceleration sensor, calculating a mean value of the measured lateral acceleration signal, and calculating, based on the further input variables of the transmission shifting program, a plurality of n≥2 different lateral acceleration sensor reference variables. The different lateral acceleration sensor reference variables are calculated by a lateral acceleration reference model for the defined route section. The method further includes determining, for each respective lateral acceleration sensor reference variable, a respective mean value of a calculated lateral acceleration, determining, by subtraction, deviations of the mean value of the measured lateral acceleration and the mean values of the calculated lateral accelerations, and evaluating, based on a magnitude of the deviations, whether or not the measured lateral acceleration and the further input variables of the transmission shifting program, based on which the different lateral acceleration reference variables have been calculated, are plausible.

BRIEF DESCRIPTION OF THE DRAWINGS

The present invention will be described in even greater detail below based on the exemplary FIGURE. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawing which illustrates the following:

FIG. 1 shows a schematically highly simplified illustration of an installation which is suitable for carrying out a method for checking the plausibility of a lateral acceleration.

DETAILED DESCRIPTION

In addition to the lateral acceleration, transmission shifting programs are also fed further kinematic input variables which are processed by said transmission shifting programs. It is therefore desirable for said further kinematic input variables also to be able to be checked for plausibility and to be verified in a suitable manner.

The present describes improved methods for checking the plausibility of a lateral acceleration and a number of further input variables of a transmission shifting program of an automated transmission of a motor vehicle.

The present disclosure describes a method for checking the plausibility of a lateral acceleration and a number of further input variables of a transmission shifting program of an automated transmission of a motor vehicle.

In a method according to the disclosure for checking the plausibility of a lateral acceleration and a number of further input variables of a transmission shifting program of an automated transmission of a motor vehicle, it is provided that:

a lateral acceleration signal of a lateral acceleration sensor is measured over at least one defined route section on which the motor vehicle is moving, and a mean value of the measured lateral acceleration is calculated therefrom;

based on the input variables of the transmission shifting program, a plurality of n≥2 different lateral acceleration sensor reference variables are calculated by way of a lateral acceleration reference model for said defined route section, and one mean value of the calculated lateral acceleration is in each case determined for each of the lateral acceleration reference variables; and the deviations of the mean value of the measured lateral acceleration and the mean values of the calculated lateral accelerations are determined by subtraction, and it is evaluated by means of the size of the deviations whether or not the measured lateral acceleration and the further input variables of the transmission shifting program, based on which the different lateral acceleration reference variables have been calculated, are plausible.

The novel approach is in particular distinguished in that, in addition to the lateral acceleration, further input variables of the transmission shifting program can also be checked for plausibility in that the mean value of the measured lateral acceleration and the mean values of the calculated lateral accelerations are compared with one another and potential deviations are determined by corresponding subtractions. For example, when a mean value of the calculated lateral accelerations significantly deviates from the remaining mean values of the calculated lateral accelerations and from the mean value of the measured lateral acceleration, this indicates that the associated input variable, from which the respective lateral acceleration reference variable has been calculated, is non-plausible. A possibly deviating mean value can thus be reliably identified in that a comparison between the mean value of the measured lateral acceleration and the mean values of the calculated lateral accelerations is performed.

The advantages of the method lie in particular in that not only the lateral acceleration measured by means of the lateral acceleration sensor, but additionally also further, likewise relevant, input variables of the transmission shifting program, can be checked for plausibility by way of a corresponding diagnosis and on account thereof be verified. The classification as to which of said input variables is erroneous under certain circumstances, is possible in an unequivocal manner with the aid of the method proposed here. With the aid of the previous solution, it was possible for only the lateral acceleration to be monitored with less accuracy.

In one preferred embodiment it can be provided that the method is carried out only in data-capable speed limits and bend curvature limits and below specific predefined road wheel slip values. It is thus ensured that the method is only carried out when specific predefined or predefinable parameters are met. The method is in particular to be preferably carried out (that is to say authorized) only when the following boundary conditions are adhered to:

time after the function is first requested>limit value (data-capable),
road wheel slip≤upper limit value (data-capable),
vehicle speed≤upper limit value (data-capable),
vehicle speed≥lower limit value (data-capable),
bend curvature≤upper limit value (data-capable),
bend curvature≥lower limit value (data-capable),
roller mode="not active",
diagnostic status="not yet calculated",
none of the input signals=error value.

In one preferred embodiment it is proposed that n=3 different lateral acceleration reference variables are calculated, from which one mean value of the calculated lateral acceleration is in each case determined.

In one particularly preferred embodiment it can be provided that road wheel speeds are used as input variables, on which basis one of the lateral acceleration reference variables is calculated. The respective lateral acceleration reference variable ay1 can in particular be at least approximately determined with the formula $$a_{y1} \approx \frac{v^2}{R}$$

wherein v denotes the mean speed of all road wheels and R is the bend radius. Apart from the bend radius, only the individual road wheel speeds from which the mean speed v is calculated are entered into this calculation.

In one further advantageous embodiment it is proposed that a yaw rate of the motor vehicle is used as an input variable, on which basis one of the lateral acceleration reference variables is calculated. The respective lateral acceleration reference variable $a_{y2}$ can be at least approximately calculated with the formula $$a_{y2} \approx v \cdot \dot{\psi}$$

wherein v denotes the mean speed of all road wheels and $\dot{\psi}$ is the yaw rate of the motor vehicle. The kinematics of a stationary circular travel is assumed herein, in which the mean speed, the yaw rate, and the attitude angle are constant and only very minor attitude angles are present.

In one particular advantageous refinement there is the possibility that a steering wheel angle is used as an input variable, on which basis one of the lateral acceleration reference variables is calculated. The mean speed v is also included in the calculation of the lateral acceleration reference variable.

In order for the accuracy of the evaluation to be increased, there is in one preferred embodiment the possibility that for evaluating whether or not the lateral acceleration and the further input variables of the transmission shifting program are plausible, the deviations of the mean value of the measured lateral acceleration from the mean values of the calculated lateral accelerations are determined over a plurality of defined route sections.

In one particularly preferred embodiment it can be provided that for those route sections in which the lateral acceleration is plausible, a difference Δ1 between the maximum mean lateral acceleration and the minimum mean lateral acceleration is calculated, and that for those route sections in which the lateral acceleration is non-plausible, a difference Δ2 between the maximum mean lateral acceleration and the minimum mean lateral acceleration is calculated. Said differences Δ1, Δ2 can likewise be included in the plausibility evaluation.

In one further advantageous embodiment there is the possibility that a counter for the plausible lateral accelerations is incremented when the lateral acceleration in an observed route section is plausible, and that a counter for the non-plausible lateral accelerations is incremented when the lateral acceleration in an observed route section is non-plausible. Said counter values can likewise be included in the plausibility evaluation. Corresponding counters which are incremented in an analogous manner when the respective input variable is or is non-plausible are preferably likewise implemented for the remaining input variables of the transmission shifting programs.

In one preferred embodiment it is proposed that in the evaluation of the lateral acceleration and/or of at least one of the further input variables as non-plausible, said information is made available to the transmission shifting program of the automated transmission. This information can then be further processed in a suitable manner by the transmission shifting program.

In one particularly preferred embodiment it can be provided that the transmission shifting program deactivates one or a plurality of sub-functions of the automated transmission in response to the non-plausible lateral acceleration and/or the at least one further non-plausible input variable. In other words, a substitute value response takes place, in particular the deactivation of sub-functions of the automated transmission, since signal errors can have an emission-relevant and consumption-relevant effect on the operation of the motor vehicle. For example, the corresponding sensor value herein can be set to zero in the transmission shifting program which is carried out by a corresponding control installation of the transmission.

Further features and advantages will become evident by means of the description hereunder of a preferred exemplary embodiment with reference to FIG. 1, which shows a schematically highly simplified illustration of an installation 1 which is suitable for carrying out a method for checking the plausibility of a lateral acceleration and a number of further input variables of a transmission shifting program of an automated transmission of a motor vehicle.

The installation 1 comprises a lateral acceleration sensor 2 by means of which the lateral accelerations arising during the driving operation of the motor vehicle can be detected in terms of measuring technology, and an evaluation installation 3 which is connected to the lateral acceleration sensor 2 and can process and evaluate the measured results of the lateral acceleration sensor 2.

When carrying out the method for checking the plausibility of the lateral acceleration and the number of further input variables of the transmission shifting program of the automated transmission, a lateral acceleration signal is measured over at least one defined route section on which the motor vehicle is moving by means of the lateral acceleration sensor 2, and said lateral acceleration signal is made available to the evaluation installation 3. The evaluation installation 3 by means of a lateral acceleration reference model is furthermore configured for calculating a plurality of n≥2 different lateral acceleration reference variables for said route section.

In this exemplary embodiment, n=3 different lateral acceleration reference variables are calculated. A first lateral acceleration reference variable ay1 can be calculated from individual road wheel speeds (road wheel rotating speeds), for example. A second lateral acceleration reference variable ay2 can in particular be calculated from the yaw rate and the mean vehicle speed. A third lateral acceleration reference variable ay3 can be calculated from the size of the steering wheel angle and the mean vehicle speed, for example.

With the aid of the evaluation installation 3, a mean value of the measured lateral acceleration of the motor vehicle on the defined route section is then determined from the lateral acceleration signal ay measured by means of the lateral acceleration sensor 2. Furthermore, a mean value of the calculated lateral acceleration is likewise determined in each case for each of the calculated lateral acceleration reference variables ay1, ay2, ay3. The deviations of said mean values of the calculated lateral accelerations ay1, ay2, ay3 from the mean value of the measured lateral acceleration ay are subsequently determined by subtraction by means of the evaluation installation 3. The evaluation installation 3 by means of the deviations finally evaluates whether or not the measured lateral acceleration in the observed route section is plausible. All calculated mean values of the lateral accelerations ay1, ay2, ay3 as well as the mean value of the measured lateral acceleration ay herein are preferably compared with one another such that a possibly deviating mean value can be reliably identified.

The advantages of this solution lie particular in that not only the sensor value of the lateral acceleration sensor 2 is verified, but additionally also the individual road wheel speeds, the steering wheel angle, and the yaw rate are verified. A verification by a diagnosis is likewise required for these signals since said signals in turn represent relevant input variables of the transmission shifting program of the automated transmission. The classification as to which of said signals is erroneous is possible in an unequivocal manner by means of the method described here. Specifically, for example, when one of the calculated mean values of the lateral acceleration deviates significantly from the remaining calculated mean values of the lateral acceleration, or from the mean value of the measured lateral acceleration, respectively, this indicates that the associated input variable based on which the respective mean value of the lateral acceleration has been calculated is non-plausible.

The method proposed here is preferably activated only in data-capable speed limits and bend radius limits as well as within specific road wheel slips. On account thereof, specific driving situations, for example the negotiating of an almost vertical wall, can be systematically precluded. The method is thus not carried out under those conditions. The road wheel slip can be determined as follows:

$$\text{Road wheel slip} = \text{MAX}(v_{Road\ wheel,fr} - v_{Road\ wheel,rr}, v_{Road\ wheel,fl} - v_{Road\ wheel,rl})$$

The speeds stated in this formula are the road wheel speeds front right (fr), rear right (rr), front left (fl), as well as a rear left (rl).

The calculation of the distance traveled by the motor vehicle can preferably take place based on the mean speeds of both road wheels of a non-driven axle of the motor vehicle.

Assuming the kinematics of a stationary circular travel in which the speed, the yaw rate, and the attitude angle are assumed to be constant and at minor attitude angles ($\beta \approx 0°$) of the motor vehicle, the lateral acceleration reference variables can be at least approximately determined with the formula $$a_{y1} \approx \frac{v^2}{R}$$

and with the formula $$a_{y2} \approx v \cdot \dot{\psi}$$

Herein, v denotes the mean speed of all road wheels, R denotes the bend radius, and $\dot{\psi}$ denotes the yaw rate of the motor vehicle.

The bend radius R can be determined by the following correlation:

$$R = \frac{b}{\frac{v_{Road\ wheel,a}}{v_{Road\ wheel,i}} - 1} + \frac{b}{2}$$

Herein, $v_{Road\ wheel,a}$ denotes the speed of the outer rear road wheel on the bend, $v_{Road\ wheel,i}$ denotes the speed of the inner rear road wheel on the bend, and b denotes the track width of the motor vehicle. The bend curvature (1/R) can also be derived in a simple manner from this formula.

As has already been mentioned above, specific parameters have to be met for calculating the deviations of the mean value of the measured lateral acceleration and the mean values of the calculated lateral accelerations over the at least one defined route section, said calculation taking place by subtraction, since errors can otherwise arise in the calculation and the evaluation of the deviations.

The method proposed here is in particular to be carried out (that is to say authorized) only when the following boundary conditions are adhered to:
time after the function is first requested>limit value (data-capable),
road wheel slip≤upper limit value (data-capable),
vehicle speed≤upper limit value (data-capable),
vehicle speed≥lower limit value (data-capable),
bend curvature≤upper limit value (data-capable),
bend curvature≥lower limit value (data-capable),
roller mode="not active",
diagnostic status="not yet calculated",
none of the input signals=error value.

In order for the plausibility of the lateral acceleration to be checked, the deviations (=the differences) between the mean value of the measured lateral acceleration and the mean values of the calculated lateral accelerations are considered.

The lateral acceleration measured within a specific route section can be considered plausible when the deviations have not exceeded a specific limit value and the observed route length reaches a specific limit value or has exceeded the latter. By contrast, the lateral acceleration measured within a specific route section can be considered non-plausible when the deviations have exceeded a specific limit value and the route length has reached or exceeded a specific limit value, or when the deviations have exceeded a specific limit value and the route length has reached or exceeded a maximum length.

The deviations of the mean value of the measured lateral acceleration from the mean values of the calculated lateral accelerations over a plurality of defined route sections are preferably determined for evaluating whether or not the lateral acceleration is plausible. On account thereof it is achieved that the statement as to whether or not the lateral acceleration and the further input variables of the transmission shifting program are plausible can be made with greater accuracy since the observation of only one route section under certain circumstances can lead to erroneous plausibility statements.

When the lateral acceleration in an observed route section is plausible, a corresponding counter for the plausible lateral translations can be incremented. In an analogous manner, a corresponding counter for the non-plausible lateral accelerations can be incremented when the lateral acceleration in an observed route section is non-plausible. A corresponding counter which operates in an analogous manner is preferably likewise provided for the remaining input variables.

Additionally, the difference $\Delta 1$ between the maximum mean lateral acceleration and the minimum mean lateral acceleration in those route sections in which the lateral acceleration is plausible, as well as the difference $\Delta 2$ between the maximum mean lateral acceleration and the mean minimum lateral acceleration in those route sections in which the lateral acceleration is non-plausible, are preferably also calculated.

As has already been mentioned, a plurality of route sections are preferably evaluated for a final statement as to whether or not the measured lateral acceleration is plausible. It is ensured herein by means of the differences $\Delta 1$, $\Delta 2$ of the maximum mean lateral acceleration and the minimum mean lateral acceleration of the observed route sections in which the lateral acceleration is plausible, or is non-plausible, respectively, that not only one operating point of the lateral acceleration sensor 2 is evaluated which under certain circumstances by virtue of an offset or the like randomly coincides with the sensor characteristic line in which the lateral acceleration is plausible, or that this is an operating point of the lateral acceleration sensor 2 in which the lateral acceleration does not appear to be plausible despite said lateral acceleration actually being plausible.

It can now be evaluated in particular according to the following criteria whether or not the lateral acceleration is plausible. The lateral acceleration is plausible when
the number of the evaluated route sections has reached or exceeded a specific limit value; and
the difference $\Delta 1$ of the maximum mean and of the minimum mean lateral acceleration in those route sections in which the lateral acceleration is plausible has reached or exceeded a specific limit value; and
the difference between the counter value of the counter for the plausible lateral accelerations and the counter value of the counter for the non-plausible lateral accelerations has reached or exceeded a specific limit value.

By contrast, the lateral acceleration can be considered non-plausible when
when the number of the evaluated route sections has reached or exceeded a specific limit value; and
the difference Δ2 of the maximum mean and of the minimum mean lateral acceleration in those route sections in which the lateral acceleration is non-plausible has reached or exceeded a specific limit value; and
the difference between the counter value of the counter for the plausible lateral accelerations and the counter value of the counter for the non-plausible lateral accelerations has undershot a specific limit value.

As can be seen in FIG. 1, the evaluation installation 3 in this exemplary embodiment is connected to a control installation 4 of the transmission of the motor vehicle that shifts in an automated manner. Alternatively, the evaluation installation 3 can also be integrated in the control installation 4.

When excessive deviations between the mean value of the measured lateral acceleration and the mean values of the calculated lateral acceleration are ascertained, the switching program of the transmission shifting in an automated manner that is carried out by the control installation 4 can deactivate one or a plurality of sub-functions of the transmission in response to said non-plausible lateral acceleration. In other words, a substitute value response, in particular the deactivation of sub-functions of the shifting program of the transmission shifting in an automated manner, takes place since signal errors can have an emission-relevant and consumption-relevant effect on the operation of the motor vehicle. For example, the corresponding sensor value herein can be set to zero in the shifting program which is carried out by the control installation 4.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for checking a plausibility of a lateral acceleration and a number of further input variables of a transmission shifting program of an automated transmission of a motor vehicle, the method comprising:

measuring, over a defined route section on which the motor vehicle is moving, a lateral acceleration signal of a lateral acceleration sensor;
calculating a mean value of the measured lateral acceleration signal;
calculating, based on the further input variables of the transmission shifting program, a plurality of $n \geq 2$ different lateral acceleration sensor reference variables, wherein the different lateral acceleration sensor reference variables are calculated by a lateral acceleration reference model for the defined route section;
determining, for each respective lateral acceleration sensor reference variable, a respective mean value of a calculated lateral acceleration;
determining, by subtraction, deviations of the mean value of the measured lateral acceleration and the mean values of the calculated lateral accelerations;
evaluating, based on a magnitude of the deviations, whether or not the measured lateral acceleration and the further input variables of the transmission shifting program, based on which the different lateral acceleration reference variables have been calculated, are plausible; and
based on the evaluation, altering the transmission shifting program of the automated transmission of the motor vehicle.

2. The method as claimed in claim 1, wherein $n=3$ different lateral acceleration reference variables are calculated, from which one mean value of the calculated lateral acceleration is in each case determined.

3. The method as claimed in claim 1, wherein the further input variables include road wheel speeds on which basis one of the lateral acceleration reference variables is calculated.

4. The method as claimed in claim 1, wherein the further input variables include a yaw rate of the motor vehicle on which basis one of the lateral acceleration reference variables is calculated.

5. The method as claimed in claim 1, wherein the further input variables include a steering wheel angle on which basis one of the lateral acceleration reference variables is calculated.

6. The method as claimed in claim 1, wherein, for evaluating whether or not the lateral acceleration and the further input variables of the transmission shifting program are plausible, the deviations of the mean value of the measured lateral acceleration from the mean values of the calculated lateral accelerations are determined over a plurality of defined route sections.

7. The method as claimed in claim 6, wherein, for route sections in which the lateral acceleration is plausible, a difference Δ1 between a respective maximum mean lateral acceleration and a respective minimum mean lateral acceleration is calculated, and wherein for route sections in which the lateral acceleration is non-plausible, a difference Δ2 between the respective maximum mean lateral acceleration and the respective minimum mean lateral acceleration is calculated.

8. The method as claimed in claim 1, wherein a counter for plausible lateral accelerations is incremented when a respective lateral acceleration in an observed route section is plausible, and wherein a counter for non-plausible lateral accelerations is incremented when the respective lateral acceleration in the observed route section is non-plausible.

9. The method as claimed in claim 1, wherein in the evaluation of the lateral acceleration and/or of at least one of the further input variables as non-plausible, information is made available to the transmission shifting program of the automated transmission.

10. The method as claimed in claim 9, wherein altering the transmission shifting program of the automated transmission of the motor vehicle comprises deactivating one or a plurality of sub-functions of the automated transmission in response to the non-plausible lateral acceleration and/or the at least one further non-plausible input variable.

11. The method as claimed in claim 10, wherein deactivating the one or the plurality of sub-functions of the automated transmission comprises setting the lateral acceleration signal of the lateral acceleration sensor to zero.

12. The method as claimed in claim 10, wherein deactivating the one or the plurality of sub-functions of the automated transmission comprises setting the at least one further non-plausible input variable to zero.

13. The method as claimed in claim 1, wherein altering the transmission shifting program of the automated transmission of the motor vehicle comprises altering operation of an internal combustion engine and exhaust emissions of the motor vehicle.

\* \* \* \* \*